US010375766B2

(12) United States Patent
Klein et al.

(10) Patent No.: US 10,375,766 B2
(45) Date of Patent: Aug. 6, 2019

(54) HEATABLE LAMINATED SIDE PANE (71) Applicant: SAINT-GOBAIN GLASS FRANCE, Courbevoie (FR)

(72) Inventors: Marcel Klein, Baesweiler (DE); Bernhard Reul, Herzogenrath (DE); Bernd Stelling, Bielefeld (DE)

(73) Assignee: SAINT-GOBAIN GLASS FRANCE, Courbevoie (FR)

(*) Notice: Subject to any disclaimer, the term of this patent is extended or adjusted under 35 U.S.C. 154(b) by 202 days.

(21) Appl. No.: 15/319,359

(22) PCT Filed: Jun. 11, 2015

(86) PCT No.: PCT/EP2015/063043
§ 371 (c)(1),
(2) Date: Dec. 15, 2016

(87) PCT Pub. No.: WO2016/000927
PCT Pub. Date: Jan. 7, 2016

(65) Prior Publication Data
US 2017/0135155 A1 May 11, 2017

(30) Foreign Application Priority Data

Jul. 1, 2014 (EP) .................................... 14175181

(51) Int. Cl.
H05B 3/18 (2006.01)
B32B 17/10 (2006.01)
(Continued)

(52) U.S. Cl.
CPC ......... H05B 3/18 (2013.01); B32B 17/10036 (2013.01); B32B 17/10385 (2013.01);
(Continued)

(58) Field of Classification Search
CPC . H05B 3/18; H05B 3/84; H05B 3/845; H05B 3/86; H05B 2203/011;
(Continued)

(56) References Cited

U.S. PATENT DOCUMENTS 3,833,451 A * 9/1974 Wagner ............. B32B 17/10174
428/67
3,947,618 A * 3/1976 Gruss ................ B32B 17/10036
428/49
(Continued)

FOREIGN PATENT DOCUMENTS

DE 69325837 T2 2/2000
DE 10126869 A1 12/2002
(Continued)

OTHER PUBLICATIONS

International Search Report for International Application No. PCT/EP2015/063043 filed on Jun. 11, 2015 in the name of Saint-Gobain Glass France. (English translation and German original) dated Aug. 11, 2015.
(Continued)

Primary Examiner — Shawntina T Fuqua
(74) Attorney, Agent, or Firm — Pillsbury Winthrop Shaw Pittman LLP (57) ABSTRACT A heatable laminated side pane for an openable side window of a vehicle is described. The side pane has an upper edge, a lower edge, a front edge, and a rear edge. The side pane also includes an outer pane and an inner pane, which are bonded to one another via a thermoplastic intermediate layer. The side pane also has at least one heating wire embedded in the intermediate layer. The heating wire runs between a first busbar and a second busbar and is electrically connected to the busbars, which are arranged along the front edge or the rear edge.

18 Claims, 5 Drawing Sheets (51) Int. Cl.
*H05B 3/86* (2006.01)
*B32B 37/14* (2006.01)

(52) U.S. Cl.
CPC ........ *B32B 17/10761* (2013.01); *B32B 37/14* (2013.01); *H05B 3/86* (2013.01); *B32B 2605/00* (2013.01); *H05B 2203/011* (2013.01); *H05B 2203/014* (2013.01)

(58) Field of Classification Search
CPC ........ H05B 2203/014; H05B 2203/025; H05B 2203/031; B32B 17/10036; B32B 17/10064; B32B 17/10385; B32B 17/10761; B32B 37/14; B32B 2605/00; B32B 2605/06

See application file for complete search history.

(56) References Cited

U.S. PATENT DOCUMENTS

| | | | |
|---|---|---|---|
| 4,513,196 A | 4/1985 | Bartelsen et al. | |
| 6,914,224 B2 | 7/2005 | Gillner et al. | |
| 8,022,334 B2 * | 9/2011 | Baumler | H05B 3/84 |
| | | | 219/203 |
| 2004/0016738 A1 * | 1/2004 | Bartrug | B32B 3/10 |
| | | | 219/203 |

FOREIGN PATENT DOCUMENTS

| | | |
|---|---|---|
| EP | 0099034 A2 | 1/1984 |
| EP | 1404153 A1 | 3/2004 |
| EP | 2584864 A1 | 4/2013 |
| WO | 2015/063043 A2 | 6/2015 |

OTHER PUBLICATIONS

Written Opinion for International Application PCT/EP2015/063043 filed Jun. 11, 2015 on behalf of Saint-Gobain Glass France. dated Aug. 11, 2015. 12 pages. (English Translation + German Original).

* cited by examiner

HEATABLE LAMINATED SIDE PANE

CROSS REFERENCE TO RELATED APPLICATIONS

The present application is the U.S. national stage entry of International Patent Application No. PCT/EP2015/063043, filed internationally on Jun. 11, 2015, which, in turn, claims priority to European Patent Application No. 14175181.8, filed on Jul. 1, 2014.

The invention relates to a heatable laminated side pane, a method for its production, and its use.

Motor vehicles typically have openable side windows. Such side windows are provided with a side pane that can be moved by substantially vertical displacement, by which means the side window can be opened and closed.

Side panes can be designed as laminated safety panes that comprise an outer pane and an inner pane that are bonded to one another via a thermoplastic intermediate layer, typically a PVB film. Also known are heatable laminated side panes that are equipped with heating wires. The heating wires are embedded in the intermediate layer. Typically, busbars are provided for the electrical contacting of the heating wires. Suitable busbars are, for example, strips of a copper foil that are connected to an external voltage source. The heating wires run between the busbars such that a current can flow through the heating wires, by which means the heating action is obtained.

Until now, the common practice has been to arrange the busbars of a heatable, laminated side pane along the lower edge of the side pane, which is always covered by the motor vehicle body. Thus, the electrical contacting of the heatable pane always remains hidden. Such side panes are known, for example, from DE10126869A1 or WO2005055667A2. Obviously, the opinion prevails that, in the opened state of the side window, busbars along side edges other than the lower edge are visible to the observer, a situation unacceptable for aesthetic reasons.

The prior art heatable side panes with the busbars along the lower edge have a number of disadvantages. The physical proximity of the two busbars with opposing polarity requires complicated insulating measures to permanently prevent short circuits. Moreover, the heating wires must be routed meanderingly starting from the lower edge over the pane back to the lower edge in order to heat the pane over its entire surface. Such a meandering course can be undesirable for aesthetic reasons. Moreover, with sharp local bends of the heating wire, locations with local overheating can form (so-called "hotspots").

The object of the present invention is to provide an improved heatable, laminated side pane.

The object of the present invention is accomplished according to the invention by a heatable laminated side pane in accordance with claim 1. Preferred embodiments emerge from the subclaims.

The heatable laminated side pane according to the invention is provided for an openable side window of a motor vehicle. This means a side window that can be opened and closed by substantially vertical displacement of the side pane into the vehicle door.

The heatable laminated side pane has an upper edge, a lower edge, a front edge, and a rear edge. The term "upper edge" denotes the side edge of the side pane that points upward in the installed position. "Lower edge" denotes the side edge that points toward the ground in the installed position. "Front edge" denotes the side edge that is directed forward in the driving direction. "Rear edge" denotes the side edge that is directed toward the rear in the driving direction.

The heatable laminated side pane comprises at least an outer pane and an inner pane that which are bonded to one another via a thermoplastic intermediate layer. "Inner pane" denotes the pane that faces the interior of the vehicle in the installed position. "Outer pane" denotes the pane that faces the external surroundings of the vehicle in the installed position. At least one heating wire is embedded in the intermediate layer. The heating wire runs between a first busbar and a second busbar and is electrically conductively connected to the busbars. The busbars are provided to be connected to an external voltage source such that a current flows between the busbars through the heating wire. The side pane can thus be conveniently deiced or freed of condensed moisture.

According to the invention, the first busbar and the second busbar are arranged along the front edge or the rear edge of the side pane. In the context of the invention, a busbar is arranged along a side edge when it is less distant from the side edge (the mean distance to said side edge is less than to all other side edges) and its direction of extension substantially follows the direction of the side edge.

The invention is based on the surprising finding that busbars can be arranged even along the front edge and the rear edge of a side pane without being visible to the observer in the opened state of the window. As long as the distance of the busbars from the edge is not too great, the busbars are advantageously hidden by body parts of the vehicle door as well as by the sealing lips customarily used with vehicle windows. The electrical contacting is thus visible in no state of the window, resulting in the fact that the side pane meets the aesthetic requirements for motor vehicle windows.

In an advantageous embodiment, the maximum distance of the busbars from the side edge along which they are arranged is less than 3 cm, preferably less than 2.5 cm, particularly preferably less than 2 cm. In the context of the invention, the maximum distance is measured between the side edge of the side pane and the edge of the busbar facing away from it. This distance is sufficiently small such that the busbars are arranged with the electrical contacting in a region that is covered by vehicle body parts and sealing lips of typical motor vehicle side windows.

The busbars must, however, not be positioned too close to the side edge since, otherwise, the bonding of the panes is disturbed and air can penetrate into the laminate via the side edge. In an advantageous embodiment, the minimum distance of the busbars from the side edge along which they are arranged is greater than 3 mm, preferably greater than 5 mm. Good results are thus achieved. In the context of the invention, the minimum distance is measured between the side edge of the side pane and the edge of the busbar facing it.

Although the invention is intended to be realized with a single heating wire, the side pane according to the invention typically has a plurality of heating wires that run between the busbars. All heating wires are supplied with current through the busbars, for which reason the connection of only two connecting cables to the external voltage supply is then necessary.

In a preferred embodiment, one busbar is arranged along the front edge and the other busbar is arranged along the rear edge of the side pane. Thus, the available non-visible regions of the side pane are optimally used. In addition, the heating wires can be routed without sharp bends and loops from the front edge to the rear edge, which is aesthetically appealing, facilitates homogeneous distribution of the heat output, and reduces the risk of local overheating.

The heating wires can, in this case, run in a preferred embodiment without sharp bends from the first busbar to the second busbar. Due to the complex shape of side panes, at least a portion of the heating wires will typically not run in a completely straight line between the busbars, in order to distribute the heating effect as much as possible over the entire pane.

Thus, for example, the heating wires will have, near the typically curved upper edge, a slight bend adapted to the upper edge.

Alternatively, the heating wires can, however, also have a meandering course. In this case, a heating wire runs, starting from the first busbar into the vicinity of the second busbar. There, the heating wire runs like a U-turn without electrically contacting the second busbar and runs back into the vicinity of the first busbar. There, the heating wire once again runs like a U-turn without electrically contacting the first busbar and runs again toward the second busbar. The heating wire either contacts the second busbar at this point or runs one more time or a plurality of other times meanderingly back and forth between the busbars before it contacts the second busbar. The advantage of such meandering routing of the heating wires resides in the lengthening of the heating wire compared to a direct connection of the busbars. By means of this lengthening, the heat output can be reduced if it would be greater than desirable with a given applied voltage and a given thickness and material of the heating wire in a direct connection of the busbars.

In an alternative preferred embodiment, both busbars are arranged along the same side edge of the side pane, i.e., either along the front edge or along the rear edge. The heating wires then run looped or meandering starting from the first busbar over the pane to the second busbar. In a particularly preferred embodiment, the two busbars are arranged overlapping, in particular, congruent, when viewed through the pane. In this case, in order to prevent a short circuit, the two busbars are preferably arranged on different sides of the thermoplastic intermediate layer. The heating wire must then be routed through the thermoplastic intermediate layer one time.

Alternatively, the two busbars can even be arranged along the same side edge and nevertheless be arranged on the same side of the thermoplastic intermediate layer. The busbars can be arranged overlapping, congruent, or even adjacent one another. A short circuit between overlapping busbars or an undesirable contact of a heating wire with a busbar can be prevented by suitable insulating measures. One such insulating measure is, for example, the application of an electrically insulating film, which preferably contains polyimide (PI) and/or polyisobutylene (PIB) and has a thickness of 10 µm to 200 µm.

In a preferred embodiment, the busbars are implemented as strips of an electrically conductive foil. The conductive foil preferably contains aluminum, copper, tinned copper, gold, silver, zinc, tungsten, and/or tin or alloys thereof, particularly preferably copper.

The thickness of the busbars is preferably from 10 µm to 500 µm, particularly preferably from 30 µm to 200 µm, for example, 50 µm or 100 µm. Busbars made of electrically conductive foils with these thicknesses are technically simple to realize and have an advantageous current carrying capacity.

The length of the busbars depends on the design of the side pane, in particular on the length of the edge along which the busbar is arranged, and the number of heating wires to be contacted, and can be appropriately selected in the individual case by the person skilled in the art. The "length" of the typically strip-shaped busbars means their longer dimension, along which they are customarily contacted with the different heating wires or hearing wire sections.

The width of the busbars is preferably from 2 mm to 20 mm, particularly preferably from 5 mm to 10 mm. With this, good results are obtained in terms of heat output but also in terms of visual inconspicuousness.

The busbars can be electrically conductively connected to the heating wires directly or, for example, via a soldering compound or an electrically conductive adhesive.

In an advantageous embodiment, the distance between adjacent heating wires or adjacent heating wire sections running substantially parallel to one another decreases, at least in sections, from the rear edge in the direction toward the front edge. Adjacent heating wires or heating wire sections thus have, in the region of the front edge, a smaller distance between them than in the region of the rear edge, which results in a higher heat output due to the high heating wire density in the region of the front edge. Through this readily realizable measure, the heat output can be, so to speak, concentrated in the region of the front edge. In particular, for front side panes, i.e., side panes of the driver and front seat passenger area, this design is advantageous because, thus, a more rapid deicing or freeing from condensation is obtained in the region of the front edge, and the view to the side mirrors of the vehicle is more quickly cleared.

Preferably, the distance between adjacent heating wires or adjacent heating wire sections decreases uniformly in the run from the rear edge to the front edge. The decrease can be strictly uniform but can also have sections separated by a constant distance, in particular in the rear region of the pane. In principle, the pane can also have regions in which the distance between adjacent heating wires or adjacent heating wire sections increases. By means of the design of the separating distances, the pane can be provided with a heat output profile that is adapted to the requirements of the individual case. The preferred decrease in the distances occurs at least in the front region of the pane in order to ensure rapid deicing of this front region and a free view of the side mirrors.

The distance between adjacent heating wires or heating wire sections is, in the region of the rear edge, preferably from 20 mm to 42 mm; in the region of the front edge, from 8 mm to 18 mm. Thus, an advantageous distribution of the heat output is obtained, which results in a rapid deicing of the front region and meets the requirements of the motor vehicle industry. If one busbar each is positioned along the front edge and the rear edge, the distances can be measured directly adjacent the respective busbar. If both busbars are arranged along the same edge, the distance in the region of this edge can be measured directly adjacent the busbar with the greater distance from the edge. The distance in the region of the other edge is measured at the point nearest the edge, of course, not taking into account any U-turns of the heating wire. The above expressions of the distances in the region of an edge must be appropriately interpreted by the person skilled in the art.

The distance between adjacent heating wires or heating wire sections is preferably, in the region of the front edge, from 25% to 90% of the distance in the region of the rear edge, particularly preferably from 30% to 50%.

The heat output in the region of the front edge is preferably from 450 W/m$^2$ to 1100 W/m$^2$; in the region of the rear edge, from 50 W/m² to 450 W/m². Thus, advantageous distribution of the heat output is obtained.

In a preferred embodiment of the invention, the connection of the connecting cable to the external voltage supply is done in the region of the lower edge. Thus, the connecting cables can be hidden in the motor vehicle body. The side pane has, for this, preferably at least one supply line, which is electrically contacted with a busbar and runs, starting from the busbars, to the lower edge. Preferably, each busbar is provided with such a supply line. The supply lines can, for example, run in the form of a straight section to the lower edge in order to be contacted there (for example, in the region of the projection of the busbar on the lower edge). The supply lines can already end within the laminate, i.e., before reaching the lower edge, and be contacted with a flat conductor. Alternatively, the supply lines can extend beyond the lower edge for contacting with the external connecting cables outside the laminate.

The ends of the supply lines opposite the busbars have, in a preferred embodiment, a distance from each other of less than or equal to 30 mm, particularly preferably less than or equal to 20 mm, most particularly preferably less than or equal to 12 mm. The supply lines can also have, when the busbars are arranged on different edges of the side pane, a section that is arranged along the lower edge. Thus, the connection points of the external connecting cables for both busbars can be routed in physical proximity to one another, a situation advantageous for the electrical connection.

The supply line is preferably implemented as strips of an electrically conductive foil. The conductive foil preferably contains aluminum, copper, tinned copper, gold, silver, zinc, tungsten, and/or tin or alloys thereof, particularly preferably copper. The thickness of the foil is preferably from 10 µm to 500 µm, particularly preferably from 30 µm to 200 µm, for example, 50 µm or 100 µm. The width of the supply lines is preferably from 2 mm to 20 mm, particularly preferably from 5 mm to 10 mm. Advantageously, the supply lines are made of the same foil as the busbars.

In a preferred embodiment, the heating wire contains aluminum, copper, tinned copper, gold, silver, zinc, tungsten, and/or tin or alloys thereof, particularly preferably copper and/or tungsten. That is advantageous for the heat output.

The thickness of the heating wire is preferably from 10 µm to 200 µm, particularly preferably from 20 µm to 100 µm, for example, 30 µm or 70 µm. Thus, good heating effects are obtained. In addition, such wires are adequately thin to be visually inconspicuous.

The busbars can be arranged between the contacted region of the heating wire and the thermoplastic film forming the intermediate layer. Alternatively, the contacted region of the heating wire can be arranged between the busbar and the thermoplastic film forming the intermediate layer. Instead of one single busbar, two busbars can also be used, between which the contacted region of the heating wire is arranged sandwich-like. In this case, the individual busbars can have a lower thickness than with the use of a single busbar in each case.

In a preferred embodiment of the invention, the heat output of the pane is at least 250 W². With this, an advantageous heating effect is obtained.

The outer pane and/or the inner pane preferably contains glass, in particular soda lime glass, or plastics, preferably rigid plastics, in particular polycarbonate, or polymethyl methacrylate.

The thickness of the panes can vary widely and thus be eminently adapted to the requirements in the individual case. Preferably, the thicknesses of the outer pane and of the inner pane are from 0.5 mm to 10 mm and preferably from 1 mm to 5 mm, most particularly preferably from 1.4 mm to 3 mm.

The outer pane, the inner pane, or the intermediate layer can be clear and colorless, but also tinted, opacified, or colored. The outer outer pane and the inner pane can be made of non-prestressed, partially prestressed, or prestressed glass.

The intermediate layer is formed by at least one thermoplastic bonding film. The thermoplastic bonding film contains at least one thermoplastic polymer, preferably ethylene vinyl acetate (EVA), polyvinyl butyral (PVB), or polyurethane (PU) or mixtures or copolymers or derivatives thereof, particularly preferably PVB. The thickness of the thermoplastic bonding film is preferably from 0.2 mm to 2 mm, particularly preferably from 0.3 mm to 1 mm, for example, 0.38 mm or 0.76 mm.

The side pane according to the invention can have other functionalities in addition to the heating function affected by the heating wires. In an advantageous embodiment, the side pane has a reflecting coating for the infrared spectrum. Such a coating can be applied on the surface of the outer pane or the inner pane, preferably on a surface facing the intermediate layer, in order to protect the coating against corrosion and mechanical impact. Alternatively, the coating can be introduced into the composite in the form of a coated thermoplastic film, made, for example, of polyethylene terephthalate (PET). In this case, the coated film is preferably arranged between a first and a second thermoplastic bonding film. IR-reflecting coatings typically have at least one electrically conductive layer. The coating can also have dielectric layers, which serve to regulate the sheet resistance, to protect against corrosion, or to reduce reflection. The conductive layer preferably contains silver or an electrically conductive oxide (transparent conductive oxide, TCO) such as indium tin oxide (ITO). The conductive layer preferably has a thickness from 10 nm to 200 nm. To improve conductivity with simultaneous high transparency, the coating can have a plurality of electrically conductive layers that are separated from one another by at least one dielectric layer. The conductive coating can contain, for example, two, three, or four electrically conductive layers. Typical dielectric layers contain oxides or nitrides, for example, silicon nitride, silicon oxide, aluminum nitride, aluminum oxide, zinc oxide, or titanium oxide. The coating preferably has a smaller area than the side pane such that a circumferential edge region with a width of preferably 0.5 mm to 10 mm is not provided with the coating. The conductive coating is thus protected inside the intermediate layer against contact with the surrounding atmosphere, a situation advantageous with regard to prevention of corrosion. The pane can also include other uncoated regions, for example, data transmission windows or communication windows.

The invention further includes a method for producing a heatable laminated side pane according to the invention, at least comprising (a) Cutting the thermoplastic intermediate layer to size, (b) Applying two busbars on the surface of the intermediate layer and applying the heating wire on the surface of the thermoplastic intermediate layer, wherein the heating wire is electrically conductively connected to both busbars, (c) Arranging the intermediate layer between an outer pane and an inner pane, (d) Bonding the outer pane to the inner pane via the intermediate layer by lamination.

The intermediate layer is provided in the form of at least one film.

The busbars and the heating wires are preferably heated, at least in regions, during or before application on the intermediate layer.

The mounting of busbars can be done in particular by placement but also by gluing. The heating of the busbars is done, for example, with a soldering iron. By means of the heating, the thermoplastic intermediate layer is to be slightly melted and thus bonded to the busbar. The temperature is preferably from 150° C. to 240° C.

Instead of using a soldering iron, it is also possible to apply the busbar on the intermediate layer with a plotter and a heatable wheel.

If the heating wire is to be arranged sandwich-like between two busbars, the upper busbar (i.e., the one that is farther from the intermediate layer at the time of placement on the intermediate layer) is preferably fixed with a higher temperature, for example, 300° C. to 360° C.).

The application of the heating wire is preferably done with a so-called "plotter". Here, the heating wire is moved with a robot arm and unwound from a spool. The heating wire is preferably heated during the application such that the thermoplastic intermediate layer melts and bonds to the heating wire. In particular, the heating wire should penetrate completely or partially into the surface of the intermediate layer such that it is embedded in the intermediate layer.

The production of the composite glass by lamination is done with customary methods known per se to the person skilled in the art, for example, autoclave methods, vacuum bag methods, vacuum ring methods, calender methods, vacuum laminators, or combinations thereof. The bonding of the outer pane and the inner pane is customarily done through the action of heat, vacuum, and/or pressure.

The side pane according to the invention is preferably used in means of transportation for travel on land, in the air, or on water, in particular in motor vehicles.

In the following, the invention is described in detail with reference to drawings and exemplary embodiments. The drawings are schematic representations and not true to scale. The drawings in no way restrict the invention.

They depict.

Figure 1:
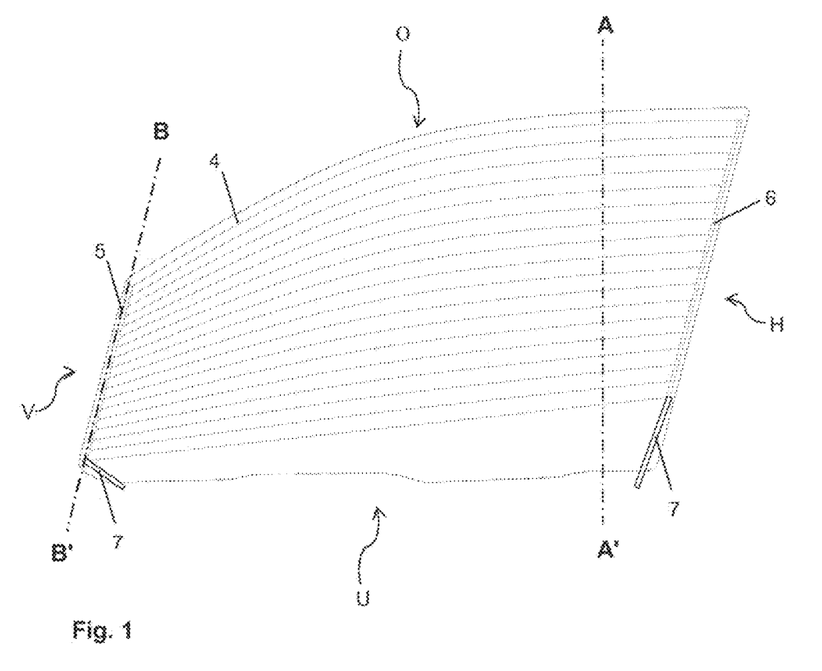
FIG. 1 a plan view of an embodiment of the side pane according to the invention, FIG. 2 a section along A-A' through the side pane of FIG. 1, FIG. 3 a section along B-B' through the side pane of FIG. 1, FIG. 4 a plan view of another embodiment of the side pane, FIG. 5 a section along B-B' through the other embodiment of the side pane, FIG. 6 a section along B-B' through the other embodiment of the side pane, FIG. 7 a plan view of another embodiment of the side pane, FIG. 8 a section along C-C' through the side pane of FIG. 7, and FIG. 9 a flowchart of an embodiment of the method according to the invention.
Figure 2:
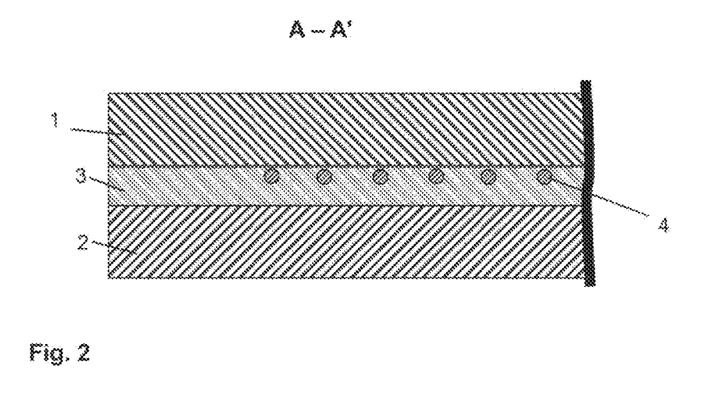
Figure 3:
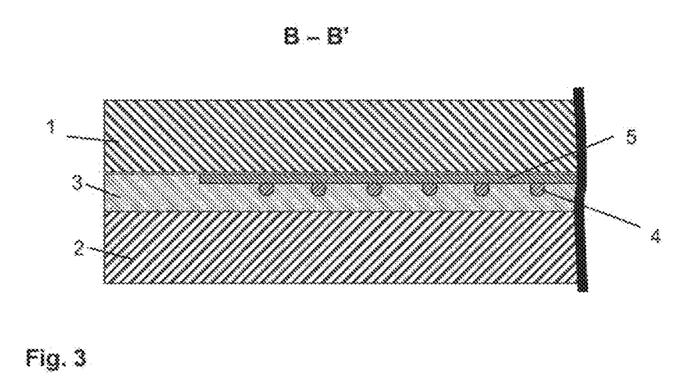

FIG. 1, FIG. 2, and FIG. 3 depict in each case a detail of an embodiment of the heatable laminated side pane according to the invention. The side pane is provided for the side window of an automobile which can be opened by lowering the side pane. The side pane has a front edge V, a rear edge H, an upper edge O, and a lower edge U. The edges are referred to according to the installed position in the direction of travel.

The side pane is a laminated glass composed of an outer pane 1, an inner pane 2, and an intermediate layer 3 that bonds the two planes to one another. The outer pane 1 and the inner pane 2 are made of soda lime glass and have, for example, a thickness, in each case, of 2.1 mm. The intermediate layer 3 is formed by a film made of PVB with a thickness of 0.76 mm.

Embedded in the intermediate layer 3 are 18 heating wires 4. The heating wires are made, for example, of copper or tungsten and have a thickness of 30 µm. Each heating wire 4 is electrically contacted to a first busbar 5 and a second busbar 6. The busbars 5, 6 are implemented as strips of a copper foil with a thickness of, for example, 100 µm and a width of, for example, 7 mm. When a voltage is applied to the busbars 5, 6, a current flows through the heating wires 4, by which means the heating action is produced. The voltage can be the customary automobile voltage of 14 V, or or even a voltage of, for example, 42 V or 48 V.

The first busbar 5 runs along the front edge V of the side pane; the second busbar 6 runs along the rear edge H. The maximum distance of the busbars from the edge along which they run is, for example, 2 cm. Contrary to the previously prevailing opinion concerning the design of generic side panes, the busbars 5, 6 are not visible to an observer even in the opened state of the side window. Instead, the busbars 5, 6 are covered by auto body parts and sealing lips of typical side windows. The minimum distance is, for example, 6 mm. This distance is sufficient to prevent disruption of the stability of the laminate and penetration of air.

The heating wires 4 run without sharp curves from the first busbar 5 to the second busbar 6. Thus, local hotspots can be prevented. In addition, the design is visually appealing. The heating wires 4 have only a slight curvature that increases as the distance from the upper edge O decreases. Thus, despite the complex pane shape with the curved upper edge O, uniform distribution of the heat output is obtained.

The distance between adjacent heating wires 4 decreases from the rear edge H to the front edge V. Thus, higher heat output is obtained in the front region of the pane. Consequently, the pane is more quickly deiced or freed of condensation there, by which means the view of the side mirrors is advantageously cleared more quickly.

The side pane also has two supply lines 7. Each supply line 7 is electrically contacted to a busbar 5, 6 and runs straight to the lower edge U, where they can be contacted with a connecting cable to the external voltage supply.

The contacted regions of the heating conductors 4 are arranged between the busbars 5, 6 and the thermoplastic film that forms the intermediate layer 3, as is discernible in the cross section.

Figure 4:
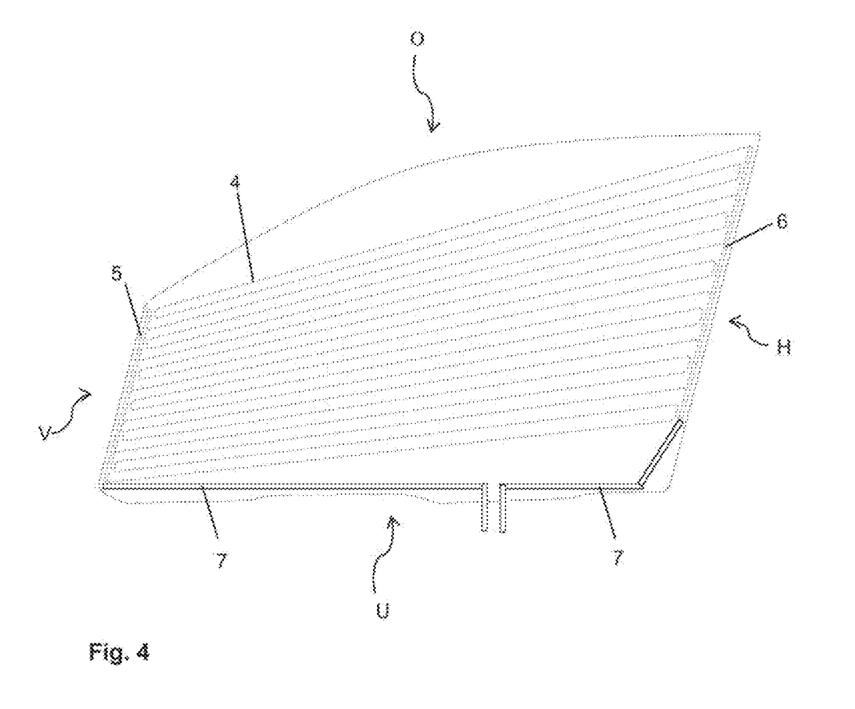

FIG. 4 depicts another embodiment of the laminated side pane according to the invention. The pane is designed similar to the preceding embodiment. The only differences consist in the course of the heating wires 4 and the supply lines 7.

The side pane has only six heating wires 4 with a thickness of, for example, 70 µm. Each heating wire 4 has a meandering course. Each heating wire 4 runs starting from the first busbar 5 straight in the direction of the second busbar 6. Shortly before reaching the second busbar 6, the heating wire 4 takes a course like a U-turn and runs straight back in the direction of the first busbar 5. After another U-turn, the heating wire 4 runs back to the second busbar 6, to which it is electrically connected.

The design of the heating wires 4 yields, so to speak, 18 heating conductors between the busbars 5, 6 similar to the above described embodiment. However, in each case, three of these heating conductors are formed by a single meandering heating wire 4. The individual heating wires 4 are, consequently, considerably longer. Thus, the heat output is reduced. An excessively high heat output, as would result from the thicker heating wires 4, can thus be prevented.

The supply lines 7 have, in each case, a section that runs along the lower edge U. The ends of the supply lines 7, which are provided with the external connection cables to the voltage supply are thus routed relative to one another and have a distance between them of, for example, 12 mm. Their low mutual separating distance can have advantages from a connection technology standpoint.

Figure 5:
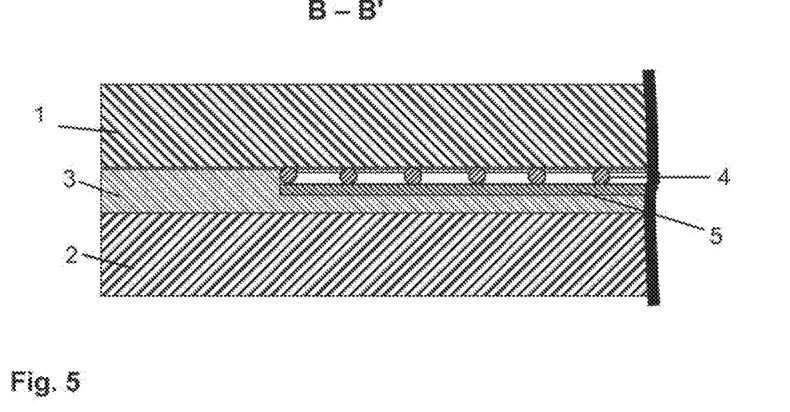

FIG. 5 depicts an alternative relative arrangement of heating wires 4, busbar 5, and intermediate layer 3. The busbar 5 is arranged between the contacted regions of the heating conductors 4 and the thermoplastic film that forms the intermediate layer 3. In the figure, the pane is shown, merely for the sake of simplicity, with empty spaces in the regions between the heating wires 4. In reality, the busbar 5 and the intermediate layer 3 are arranged under the action of pressure around the heating wires 4 such that no relatively large empty spaces are produced.

Figure 6:
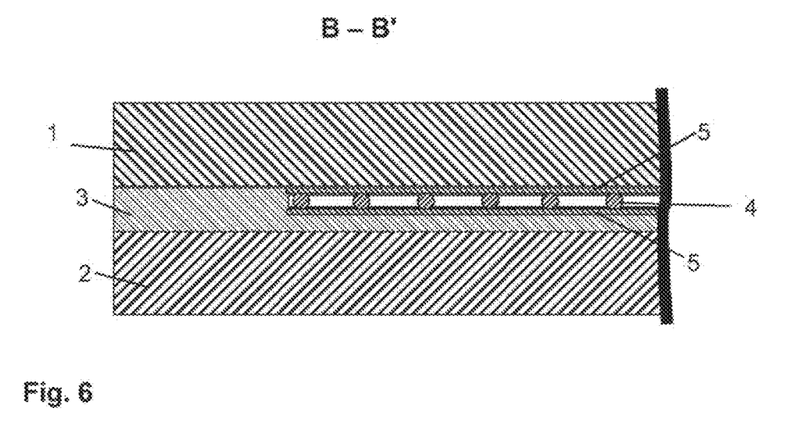

FIG. 6 depicts another alternative relative arrangement of heating wires 4, busbar 5, and intermediate layer 3. The electrical contacting is done here by means of two busbars 5 of the same electrical polarity, between which the heating wires 4 are arranged sandwich-like. In this embodiment, thinner films can be used as busbars 5 than in that depicted above, for example, with a thickness of 50 μm.

Figure 7:
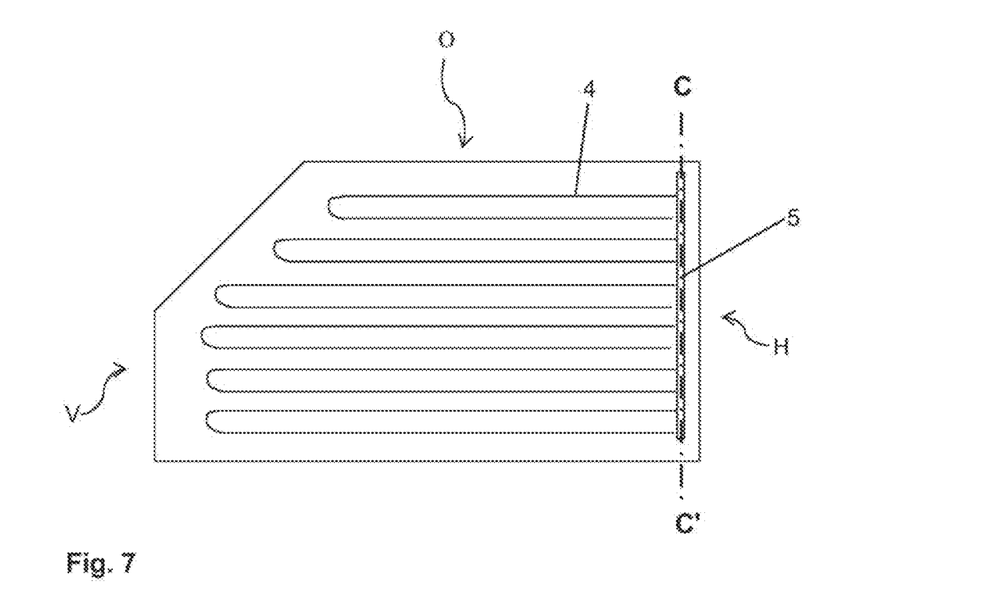
Figure 8:
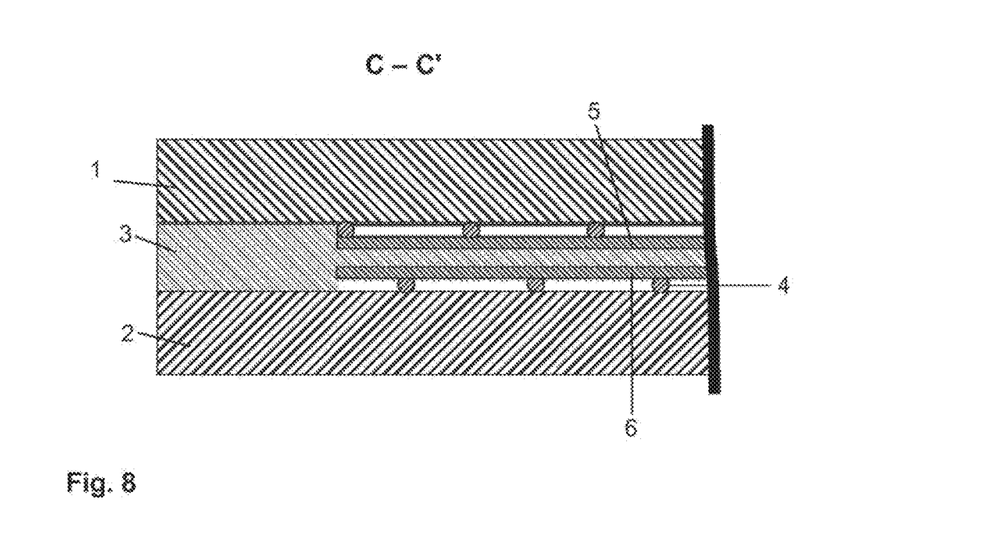

FIG. 7 and FIG. 8 each depict a detail of another embodiment of the heatable laminated side pane according to the invention. The two busbars 5, 6 are arranged along the same edge, namely the rear edge H. The side pane has six heating wires 4. Each heating wire 4 runs, starting from the first busbar 5, roughly horizontally into the vicinity of the front edge V, takes a course there like a U-turn, and runs roughly horizontally back to the second busbar 6. The busbars 5, 6 are arranged covering one another. In order to electrically isolate the busbars 5, 6 from one another, they are arranged on different sides of the thermoplastic film that forms the intermediate layer 3. Each heating wire 4 runs once through the intermediate layer 3. Each heating wire 4 thus consists of two regions, with one region embedded in the surface of the intermediate layer 3 and the other region embedded in the opposite surface of the intermediate layer 3. To that end, the heating wire 4 can be inserted through a hole introduced in the thermoplastic film.

Figure 9:
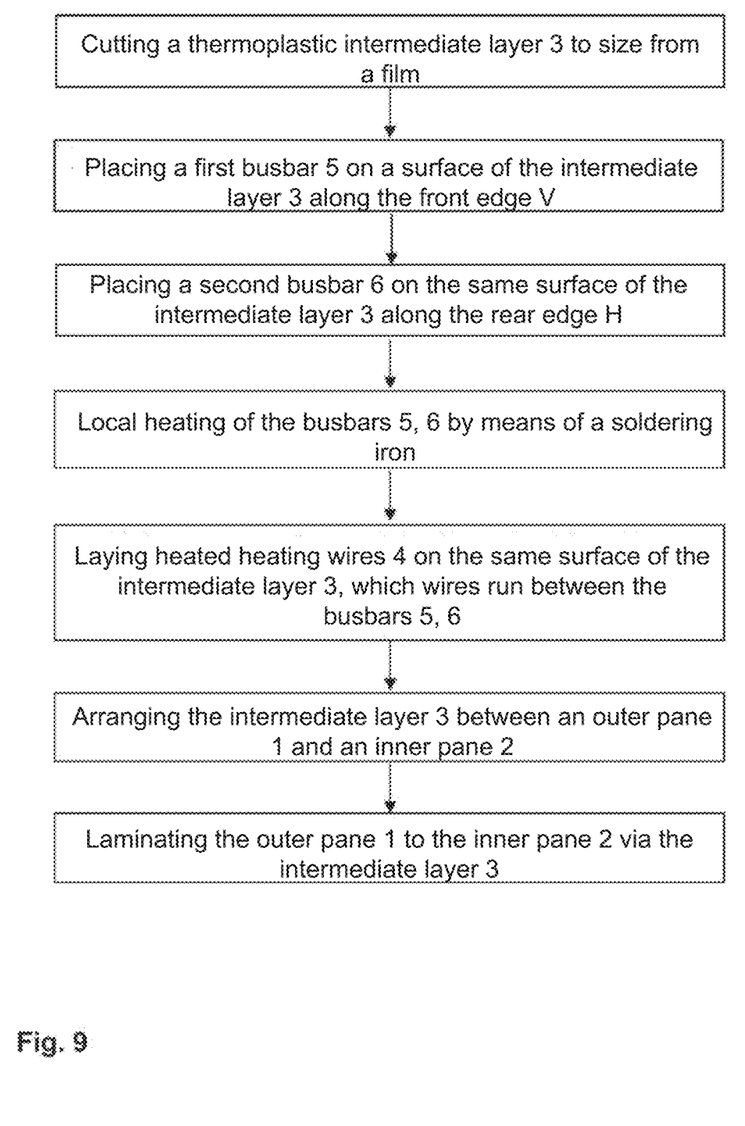

FIG. 9 depicts a flowchart of an exemplary embodiment of the method according to the invention for producing a laminated heatable side pane according to the invention.

In an alternative embodiment, the busbars 5, 6 can be arranged on the opposite surfaces of the intermediate layer 3, in particular if they are to be arranged covering one another. In this case, the laying of the heating wires 4 is interrupted one time, the heating wires routed through the intermediate layer, and the laying then continued on the opposite surface.

LIST OF REFERENCE CHARACTERS (1) outer pane
(2) inner pane
(3) thermoplastic intermediate layer
(4) heating wire
(5) first busbar
(6) second busbar
(7) supply line H rear edge of the side pane
O upper edge of the side pane
V front edge of the side pane
U lower edge of the side pane
A-A' section line
B-B' section line
C-C' section line

The invention claimed is:

1. A heatable laminated side pane for an openable side window of a motor vehicle, said heatable laminated side pane comprising:
   an upper edge, a lower edge, a front edge, and a rear edge,
   an outer pane and an inner pane, said outer pane and said inner pane bonded to one another via a thermoplastic intermediate layer, and
   at least one heating wire embedded in the intermediate layer, said heating wire electrically connected to a first busbar and a second busbar,
   wherein:
      the first busbar and the second busbar are arranged along a same edge of the front edge and the rear edge,
      the first busbar is arranged on a surface of the intermediate layer and the second busbar is arranged overlappingly on an opposite surface of the intermediate layer,
      a maximum distance of the first busbar or the second busbar from a respective front edge or rear edge is less than 3 cm, and
      a minimum distance of the first busbar or the second busbar from said respective front edge or rear edge is greater than 3 mm.

2. The heatable laminated side pane according to claim 1, wherein the first busbar is arranged along the front edge and the second busbar is arranged along the rear edge.

3. The heatable laminated side pane according to claim 1, wherein said at least one heating wire is a plurality of heating wires, and a distance between adjacent heating wires of the plurality of heating wires decreases from the rear edge to the front edge.

4. The heatable laminated side pane according to claim 1, wherein said maximum distance is less than 2.5 cm.

5. The heatable laminated side pane according to claim 1, wherein said minimum distance is greater than 5 mm.

6. The heatable laminated side pane according to claim 1, wherein the first busbar or the second busbar comprises at least one strip of an electrically conductive foil.

7. The heatable laminated side pane according to claim 1, wherein thickness of the first busbar or the second busbar is from 10 μm to 500 μm.

8. The heatable laminated side pane according to claim 1, wherein width of the first busbar or the second busbar is from 2 mm to 20 mm.

9. The heatable laminated side pane according to claim 1, further comprising at least one supply line electrically connected to at least one of said first busbar and second busbar, said at least one supply line extending to said lower edge of said side pane.

10. The heatable laminated side pane according to claim 9, wherein the first busbar and the second busbar are electrically connected to said at least one supply line and wherein a distance between a first end and a second end of the at least one supply line is not greater than 30 mm.

11. The heatable laminated side pane according to claim 1, wherein the at least one heating wire comprises an electrically conductive metal selected from the group consisting of i) copper, ii) tungsten, and iii) copper and tungsten, and wherein thickness of the at least one heating wire is from 10 μm to 200 μm.

12. The heatable laminated side pane according to claim 4, wherein said maximum distance is less than 2 cm.

13. The heatable laminated side pane according to claim 6, wherein the at least one strip of an electrically conductive foil comprises copper.

14. The heatable laminated side pane according to claim 7, wherein said thickness is from 30 μm to 200 μm.

15. The heatable laminated side pane according to claim 8, wherein said width is from 5 mm to 10 mm.

16. The heatable laminated side pane according to claim 10, wherein said distance between said first end and said second end of the at least one supply line is not greater than 20 mm.

17. A method for producing a heatable laminated side pane, comprising:
cutting a thermoplastic intermediate layer to size;
applying a first busbar and a second busbar onto at least one surface of the intermediate layer;
applying at least one heating wire onto the at least one surface of the thermoplastic intermediate layer, wherein the at least one heating wire is electrically connected to said first busbar and said second busbar;
arranging the intermediate layer between an outer pane and an inner pane; and
bonding the outer pane to the inner pane via the thermoplastic intermediate layer by lamination,
thereby producing the heatable laminated side pane that comprises
an upper edge, a lower edge, a front edge, and a rear edge,
the outer pane and the inner pane, said outer pane and said inner pane bonded to one another via the thermoplastic intermediate layer, and
the at least one heating wire embedded in the thermoplastic intermediate layer, said heating wire electrically connected to the first busbar and the second busbar,
wherein the first busbar and the second busbar are arranged along a same edge of the front edge and the rear edge,
wherein the first busbar is arranged on a surface of the intermediate layer and the second busbar is arranged overlappingly on an opposite surface of the intermediate layer,
wherein a maximum distance of the first busbar or the second busbar from a respective front edge or rear edge is less than 3 cm, and
wherein a minimum distance of the first busbar or the second busbar from said respective front edge or rear edge is greater than 3 mm.

18. A method comprising:
using the heatable laminated side pane of claim 1 in a means of transportation.

* * * * *